United States Patent
Bakk

(10) Patent No.: US 12,181,561 B2
(45) Date of Patent: Dec. 31, 2024

(54) SENSOR ARRANGEMENT

(71) Applicant: Tridonic GmbH & Co KG, Dornbirn (AT)

(72) Inventor: Istvan Bakk, Torokbalint (HU)

(73) Assignee: Tridonic GmbH & Co KG, Dornbirn (AT)

( * ) Notice: Subject to any disclaimer, the term of this patent is extended or adjusted under 35 U.S.C. 154(b) by 9 days.

(21) Appl. No.: 17/641,223

(22) PCT Filed: Aug. 7, 2020

(86) PCT No.: PCT/EP2020/072242
§ 371 (c)(1),
(2) Date: Mar. 8, 2022

(87) PCT Pub. No.: WO2021/047835
PCT Pub. Date: Mar. 18, 2021

(65) Prior Publication Data
US 2024/0045048 A1 Feb. 8, 2024

(30) Foreign Application Priority Data

Sep. 9, 2019 (EP) .................................. 19196084

(51) Int. Cl.
*G01S 13/56* (2006.01)
*G01S 7/41* (2006.01)
*G01S 13/58* (2006.01)
*G01S 13/86* (2006.01)

(52) U.S. Cl.
CPC .............. *G01S 13/56* (2013.01); *G01S 7/415* (2013.01); *G01S 13/583* (2013.01); *G01S 13/86* (2013.01)

(58) Field of Classification Search
CPC .......... G01S 13/04; G01S 13/56; G01S 7/415; G01S 13/583; G01S 13/86; G01S 13/862; G01S 13/88; F21V 23/0471
See application file for complete search history.

(56) References Cited

U.S. PATENT DOCUMENTS

| 4,197,537 A | 4/1980 | Follen et al. |
| 5,682,164 A | 10/1997 | McEwan |
| 7,916,066 B1 * | 3/2011 | Osterweil ............. A61B 5/1117 |
| | | 382/115 |

(Continued)

FOREIGN PATENT DOCUMENTS

| DE | 10 2014 226891 | 6/2016 | |
| DE | 102014226891 A1 * | 6/2016 | .......... F21V 23/0442 |

(Continued)

OTHER PUBLICATIONS

PCT/EP2020/072242, International Search Report and Written Opinion dated Nov. 30, 2020, 13 pages.

*Primary Examiner* — Peter M Bythrow
(74) *Attorney, Agent, or Firm* — Andrus Intellectual Property Law, LLP

(57) ABSTRACT

The invention relates to a sensor arrangement (101) configured to detect a motion of an object. The sensor arrangement (101) comprises a motion sensor (101a) configured to detect data about the motion of the object; a vibration sensor (101b) configured to detect a vibration of the sensor arrangement (101), wherein if the vibration is lower than a threshold value, then an output signal of the sensor arrangement (101) signaling the motion of the object is output.

12 Claims, 1 Drawing Sheet

(56) References Cited

U.S. PATENT DOCUMENTS

| | | | | |
|---|---|---|---|---|
| 9,210,759 | B2* | 12/2015 | Reed | H05B 47/115 |
| 10,524,330 | B1* | 12/2019 | Wagner | H05B 47/13 |
| 2009/0091444 | A1* | 4/2009 | Hierzer | H05B 45/00 |
| | | | | 340/541 |
| 2010/0141443 | A1* | 6/2010 | Romero | G08B 29/20 |
| | | | | 340/552 |
| 2011/0175768 | A1* | 7/2011 | Peczalski | G01S 13/62 |
| | | | | 342/118 |
| 2014/0265842 | A1* | 9/2014 | Potucek | H05B 47/185 |
| | | | | 315/77 |
| 2015/0264459 | A1* | 9/2015 | Luna | F21V 33/0056 |
| | | | | 381/386 |
| 2015/0301167 | A1* | 10/2015 | Sentelle | A61B 5/0205 |
| | | | | 342/22 |
| 2017/0123058 | A1* | 5/2017 | Yavari | G01S 13/86 |

FOREIGN PATENT DOCUMENTS

| | | |
|---|---|---|
| DE | 10 2017 205331 | 10/2018 |
| GB | 2492550 | 9/2013 |

* cited by examiner

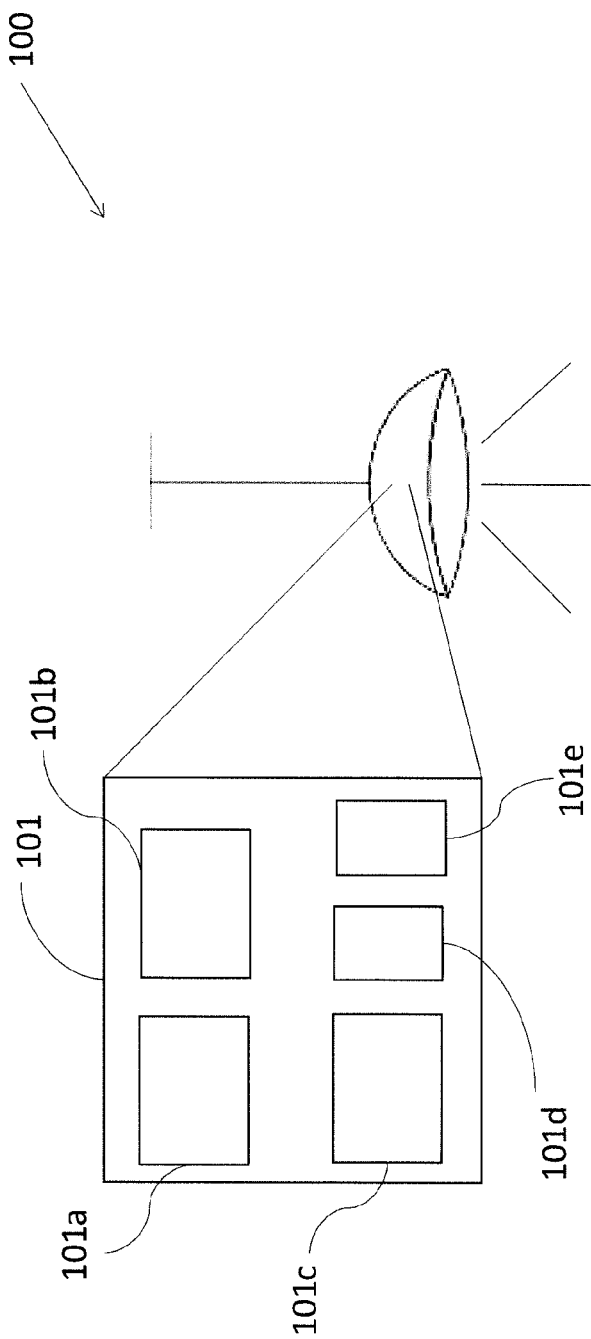

SENSOR ARRANGEMENT

CROSS REFERENCE TO RELATED APPLICATIONS

The present application is the U.S. national stage application of international application PCT/EP2020/072242 filed Aug. 7, 2020, which international application was published on Mar. 18, 2021 as International Publication WO 2021/047835 A1. The international application claims priority to European Patent Application 19196084.8 filed Sep. 9, 2019.

FIELD OF THE INVENTION

The invention relates to a sensor arrangement. The invention further relates to a luminaire comprising the sensor arrangement.

BACKGROUND OF THE INVENTION

Among the sensors for detecting the motion of an object or person there are continuous wave (CW) doppler radar motion sensors which emit a continuous wave carrier and mix the transmitted radio frequency (RF) with the return echoes to produce a difference frequency equal to the Doppler shift produced by a moving target.

Another type of motion sensor is given by amplitude modulated (AM), or pulse, doppler motion sensors which have been described in U.S. Pat. No. 4,197,537 by Follen et al., in U.S. Pat. No. 5,682,164 by McEwan, and others.

However, it is known that external causes, such as passing trucks, banging doors and the like, can lead to a non-repetitive own motion of the sensor, especially when the sensor is mounted to a suspended sealing. This non repetitive motion of the sensor causes the Doppler radar sensor to be triggered which then can for example lead to switching on of an associated luminaire.

In fact, as the sensors are sensing any kind of motion, even through walls they are prone to miss-triggering by any objects moving, including fans or vibration of environment. The most common miss-triggering of these sensors comes from environmental repetitive or constant noise.

Moreover, repetitive, burst like motions signals are very difficult to distinguish from a human motion.

Furthermore, a relative common issue is the motion of the environment of the sensor when the sensor is actually moving and gives the same signal as everything else would be moving.

Furthermore, the vibration of suspended ceiling induced by traffic or other means is a common and frequent issue triggering the radar similarly to the human motion. A complete building can light up, when a tram/train, suburban railway pass close to the building.

Thus, it is an objective to provide for an improved sensor arrangement for detecting the motion of an object or human being.

SUMMARY OF THE INVENTION

The object of the present invention is achieved by the solution provided in the enclosed independent claims. Advantageous implementations of the present invention are further defined in the dependent claims.

According to a first aspect of the invention, a sensor arrangement is provided. The sensor arrangement is configured to detect a motion of an object, comprising a motion sensor configured to detect data about the motion of the object, a vibration sensor configured to detect a vibration of the sensor arrangement, wherein if the vibration is lower than a threshold value, then an output signal of the sensor arrangement signaling the motion of the object is output.

This provides the advantage that a very accurate determination of the motion of a person, for example, can be achieved. This has the advantage that, in the case the sensor arrangement is located in a luminaire, the luminaire turns on only if people are passing by. Therefore, energy can be saved.

In an embodiment, the motion sensor is a doppler radar sensor.

This provides the advantage that a well known sensor can be used in order to determine the motion of the object or person.

In a further embodiment, the doppler radar sensor is a radio frequency, microwave frequency or mm-wave frequency doppler radar sensor.

This provides the advantage that a well known sensor can be used in order to determine the motion of the object or person.

In a further embodiment, the motion sensor is a frequency modulated continuous wave (FMCW) doppler sensor.

This provides the advantage that a well known sensor can be used in order to determine the motion of the object or person.

In a further embodiment, the vibration sensor is an accelerometer configured to detect an acceleration of the sensor arrangement.

This provides the advantage that an economic and reliable sensor is used. Accelerometers are sensitive enough for giving a reliable and fast signal in order to omit the signal from the radar sensor to avoid false trigger. As an additional feature, higher levels of accelerations can be sensed as well on dangerous seismic vibrations, such as earthquakes, and the sensor can be configured to trigger an alarm.

Furthermore, this provides the advantage that the accelerometer is a well known and accurate kind of sensor.

In a further embodiment, the sensor arrangement further comprises a processor configured to calculate a radar acceleration on the basis of a radar signal detected by the motion sensor and calculate a difference between the acceleration detected by the accelerometer and the radar acceleration.

This provides the advantage that an accurate determination of the motion of the object can be achieved since two different kinds of measurements are used.

In a further embodiment, if the acceleration is lower than the threshold value, then the sensor arrangement is configured to accept the detection of the motion of the object.

This provides the advantage that the determination of the motion of the object is done by using a simple criterion.

In a further embodiment, the sensor arrangement further comprises a microphone.

This provides the advantage that the motion of the object can be determined thanks to the detection of sounds, making it easier to identify the motion.

In a further embodiment, the sensor arrangement further comprises an acoustic sensor.

This provides the advantage that the motion of the object can be determined thanks to the detection of sounds, making it easier to identify the motion.

In a further embodiment, if an acoustic signal matches a predefined signal pattern evaluated by the processor, then the sensor arrangement is configured to reject the detection of the motion of the object with or without a combination with a signal provided by the vibration sensor (101*b*).

This provides the advantage that the determination of the motion of the object is done by using a simple criterion.

In a further embodiment, the sensor arrangement is configured to perform a FFT on the acceleration detected by the accelerometer.

Performing an FFT allows to detect anomalies in the acceleration signal detected by the accelerator which, in turn, allows to identify if the detected motion comes from the object or not.

In a further embodiment, the sensor arrangement is configured to trigger an alarm, if the acceleration is greater than an alarm threshold value.

This allows to detect in an efficient way the presence or the absence of the moving object.

In a further embodiment, the vibration sensor is a micromachined microelectromechanical systems (MEMS) accelerometer.

This provides the advantage that space can be saved, due to the size of the MEMS accelerometer.

Furthermore, this provides the advantage that a cheap and reliable additional feature for sensor arrangement misstriggering is achieved.

In a further embodiment, the sensor arrangement is further configured to send the detection data to a wireless network.

This provides the advantage that the data about the motion of the object can be communicated in a very fast and efficient way between the sensor arrangement and the wireless network.

According to a second aspect, the invention relates to a luminaire comprising the sensor arrangement according to the first aspect or any one of the implementation forms thereof.

BRIEF DESCRIPTION OF THE DRAWINGS

The invention will be explained in the followings together with the FIGURES.

FIG. 1 shows an embodiment of a luminaire comprising a sensor arrangement according to an embodiment.

DETAILED DESCRIPTION

Aspects of the present invention are described herein in the context of a sensor arrangement.

The present invention is described more detailed hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of a sensor arrangement will be presented. However, as those skilled in the art will readily appreciate, these aspects may be extended to aspects of sensor arrangements without departing from the invention.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Now referring to FIG. 1, a luminaire 100 comprising a sensor arrangement 101 according to an embodiment is shown.

The sensor arrangement 101 is configured to detect a motion of an object. The sensor arrangement 101 comprises a motion sensor 101a configured to detect data about the motion of the object and a vibration sensor 101b configured to detect a vibration of the sensor arrangement 101. Moreover, if the vibration is lower than a threshold value, then an output signal of the sensor arrangement 101 signaling the motion of the object is output.

This provides the advantage that the amount of fake triggering of radar doppler sensors is decreased.

The sensor arrangement can be comprised in the luminaire 100.

The motion sensor 101a can be a radar sensor used together with the luminaire 100 in order to detect especially the motion in a detection area, and then typically switch on or change the dimming level of the associated luminaire 100.

This provides the advantage that a triggering of the radar sensor actually not caused by the motion of a human, for example entering a room, is avoided.

In an embodiment, the motion sensor 101a can be combined with an accelerometer. If the accelerometer detects an acceleration going beyond a given threshold, any triggering on signal of the radar sensor or sensor arrangement 101 will be rejected.

In a further embodiment, a microphone 101d or other acoustic sensor 101e can be added, wherein the trigger signal of the sensor arrangement 101 will also be disregarded in case the acoustic sensor 101e detects an acoustic level going beyond a given threshold.

The combination of the accelerometer signal and the radar sensor or sensor arrangement signal can be made even in a more sophisticated manner such that the acceleration detected by the accelerometer is subtracted from the acceleration deduced from the motion detected by the radar signal and only the remaining difference which could then be a human beings motion during noise production would still be detected.

Furthermore, the processing of the output signal of the accelerometer can be most sophisticated than simply making a threshold comparison. The fingerprint of the accelerometer signal can be evaluated, for example using an FFT, such that this more complex evaluation leads to the conclusion that a signal triggering on signal has to be rejected.

In an embodiment, the motion sensor is a 24 Ghz doppler radar integrated in light engines to sense the motion and presence of a person and to forward the sensed data to the wireless network.

The resonance of buildings can advantageously and effectively be detected by the above mentioned mems accelerometer.

The motion sensor 101a can be a doppler or FMCW radar sensor which is in a mechanical connection with the vibration sensor 101b.

The sensor arrangement 101 can be used in building automation.

The doppler radar sensor can be a radio frequency, microwave frequency or mm-wave frequency radar doppler sensor.

The vibration sensor 101b can be a mems accelerometer.

If the vibration sensor 101b is activated at a certain magnitude or frequency, an alarm can be triggered as an indication of seismic activities.

Moreover, the accelerometer and the doppler radar sensor can be built in a LED lamp.

The doppler sensor can be operated in FMCW mode (frequency modulated continuous wave).

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A sensor arrangement (101) configured to detect a motion of an object and output a trigger signal for a luminaire in response to detected motion, comprising:
   a radar Doppler motion sensor (101a) configured to output a radar signal about the relative motion of the object with respect to the motion sensor;
   a vibration sensor (101b) comprising an accelerometer configured to detect acceleration of the sensor arrangement (101); and
   a processor (101c) configured to calculate a radar acceleration on the basis of the radar signal detected by the motion sensor (101a) and the acceleration detected by the accelerometer and to normally output a trigger signal if the calculated radar acceleration signal exceeds a motion level threshold value.

2. The sensor arrangement (101) of claim 1, wherein the motion sensor is a doppler radar sensor.

3. The sensor arrangement (101) of claim 2, wherein the doppler radar sensor is a radio frequency, microwave frequency or mm-wave frequency doppler radar sensor.

4. The sensor arrangement (101) of claim 1, wherein the motion sensor is a frequency modulated continuous wave (FMCW) doppler sensor.

5. The sensor arrangement (101) of claim 1, wherein the sensor arrangement (101) is configured to trigger an alarm, if the acceleration is greater than an alarm threshold value.

6. The sensor arrangement (101) of claim 1, wherein the vibration sensor (101b) is a micromachined microelectro-mechanical systems (MEMS) accelerometer.

7. The sensor arrangement (101) of claim 1, wherein the sensor arrangement (101) is further configured to send the detection data to a wireless network.

8. A luminaire (100) comprising the sensor arrangement (101) of claim 1.

9. The sensor arrangement (101) of claim 1 wherein the processor (101c) is further configured to calculate vibration level of the sensor arrangement based on the acceleration detected by the accelerometer and to not output the trigger signal if the calculated vibration level is above a vibration threshold value.

10. The sensor arrangement (101) of claim 9, wherein the sensor arrangement further comprises a microphone (101d).

11. The sensor arrangement (101) of claim 9, wherein the sensor arrangement further comprises an acoustic sensor (101e).

12. The sensor arrangement (101) of claim 11, wherein if an acoustic signal matches a predefined signal pattern evaluated by the processor (101c), then the sensor arrangement (101) is configured to reject the detection of the motion of the object with or without a combination with a signal provided by the vibration sensor (101b).

* * * * *